(12) United States Patent
Dornbusch et al.

(10) Patent No.: US 12,722,076 B2
(45) Date of Patent: Sep. 1, 2026

(54) ACCESSORY USABLE WITH DIFFERENT VIDEO GAME CONTROLLERS

(71) Applicant: COLLECTIVE MINDS GAMING CO. LTD., Maple Ridge (CA)

(72) Inventors: Ken Dornbusch, Maple Ridge (CA); Darren Ali, Maple Ridge (CA)

( * ) Notice: Subject to any disclaimer, the term of this patent is extended or adjusted under 35 U.S.C. 154(b) by 264 days.

(21) Appl. No.: 18/532,488

(22) Filed: Dec. 7, 2023

(65) Prior Publication Data

US 2024/0189705 A1 Jun. 13, 2024

Related U.S. Application Data

(60) Provisional application No. 63/430,919, filed on Dec. 7, 2022.

(51) Int. Cl.
*A63F 13/24* (2014.01)
*A63F 13/98* (2014.01)

(52) U.S. Cl.
CPC .............. *A63F 13/24* (2014.09); *A63F 13/98* (2014.09)

(58) Field of Classification Search
None
See application file for complete search history.

(56) References Cited

U.S. PATENT DOCUMENTS 2,932,358 A 4/1960 Hopfeld
4,552,360 A 11/1985 Bromley et al.
5,531,443 A 7/1996 Cruz
D376,826 S 12/1996 Ashida
D377,198 S 1/1997 Oikawa et al.
D384,112 S 9/1997 Riley et al.
5,670,988 A 9/1997 Tickle
5,716,274 A 2/1998 Goto et al.
D393,291 S 4/1998 Kung
(Continued)

FOREIGN PATENT DOCUMENTS

CA 2747151 A1 1/2013
CA 142555 S 4/2013
(Continued)

OTHER PUBLICATIONS

Dave Burns, Review:Scuf Xbox 360 Controller, Oct. 20, 2010, Source http://www.xboxer360.com/features/review-scuf-xbox-360-controller/.

(Continued)

*Primary Examiner* — Jason T Yen
(74) *Attorney, Agent, or Firm* — Bennett Jones LLP

(57) ABSTRACT

An accessory for video game controller has a body that can be alternately attached to either first video game controller (e.g., Xbox One™ controller) or a second video game controller (e.g., Xbox Series X|S™ controller) having differing geometry, and an accessory port that can be connected to controller ports of differing types (e.g., USB micro-B type and standard C type). The attachment of the body is achieved by first and second body adapters that are releasably attachable, by interference fit, to the body, and to the first and second controllers, respectively. The connection of the accessory port is achieved by first and second accessory port adapters that are releasably connectable to the accessory port, and to the first and second controller ports, respectively.

6 Claims, 4 Drawing Sheets

(56) References Cited

U.S. PATENT DOCUMENTS 5,759,100 A 6/1998 Nakanishi
5,853,326 A 12/1998 Goto et al.
5,874,906 A 2/1999 Willner et al.
5,883,690 A 3/1999 Meyers et al.
D409,183 S 5/1999 Chen
5,923,317 A 7/1999 Sayler et al.
D416,247 S 11/1999 Flender et al.
5,984,785 A 11/1999 Takeda et al.
6,001,014 A 12/1999 Ogata et al.
6,019,680 A 2/2000 Cheng
6,102,803 A 8/2000 Takeda et al.
D431,604 S 10/2000 Chan
6,135,886 A 10/2000 Armstrong
6,171,191 B1 1/2001 Ogata et al.
6,186,896 B1 2/2001 Takeda et al.
6,210,278 B1 4/2001 Kilstner
6,225,975 B1 5/2001 Furuki et al.
6,231,444 B1 5/2001 Goto et al.
6,241,611 B1 6/2001 Takeda et al.
6,261,180 B1 7/2001 Lebensfeld et al.
6,267,673 B1 7/2001 Miyamoto et al.
6,280,327 B1 8/2001 Leifer et al.
6,342,009 B1 1/2002 Soma
6,394,906 B1 5/2002 Ogata
D469,436 S 1/2003 Hussaini et al.
D471,552 S 3/2003 Loughnane et al.
6,572,108 B1 6/2003 Bristow
6,743,100 B1 6/2004 Neiser
6,811,491 B1 11/2004 Levenberg et al.
D508,090 S 8/2005 Blackwell, III
D545,317 S 6/2007 Wang et al.
7,283,125 B2 10/2007 Martinez et al.
D568,885 S 5/2008 Solland
D575,350 S 8/2008 Ashida et al.
D610,625 S 2/2010 Guinchard et al.
7,762,553 B2 7/2010 Harris
D620,939 S 8/2010 Suetake et al.
D622,992 S 9/2010 Dodd
D624,080 S 9/2010 Jennings et al.
D624,601 S 9/2010 Grossman
7,859,514 B1 12/2010 Park
D631,098 S 1/2011 Ashida et al.
D632,340 S 2/2011 Guinchard et al.
D632,742 S 2/2011 Mueller
D632,743 S 2/2011 Mueller
D633,153 S 2/2011 Holcomb et al.
D638,017 S 5/2011 Ortiz
D667,892 S 9/2012 Burgess et al.
D673,618 S 1/2013 Harper
8,576,199 B1 11/2013 Pryor
8,641,525 B2 2/2014 Burgess et al.
D706,874 S 6/2014 Ngoy et al.
8,752,802 B1 6/2014 Fan
8,753,206 B2 6/2014 Ali et al.
D708,675 S 7/2014 Delrue et al.
D710,945 S 8/2014 Biheller et al.
D717,875 S 11/2014 Uhrman et al.
D721,139 S 1/2015 Burgess et al.
D723,032 S 2/2015 Schoenith et al.
D733,802 S 7/2015 Burgess et al.
9,089,770 B2 7/2015 Burgess
D736,322 S 8/2015 Navid
D748,734 S 2/2016 Burgess et al.
D752,150 S 3/2016 Young
D752,688 S 3/2016 Jensen
D777,260 S 1/2017 Burgess et al.
D778,989 S 2/2017 Ali et al.
D808,466 S 1/2018 Foster et al.
D810,202 S 2/2018 Foster et al.
D810,831 S 2/2018 Ali et al.
D819,140 S 5/2018 Ali et al.
10,252,173 B2 4/2019 Dornbusch et al.
10,463,979 B2 11/2019 Dornbusch et al.
D870,207 S 12/2019 Ali et al.
D885,387 S 5/2020 Hu
D909,488 S 2/2021 Zheng
D933,751 S 10/2021 Kobayashi et al.
D934,343 S 10/2021 Ali et al.
11,192,037 B2 12/2021 Dornbusch et al.
D953,439 S 5/2022 Wang
D954,836 S 6/2022 Zhu
D958,891 S 7/2022 Kobayashi et al.
D963,751 S 9/2022 Chatterjee et al.
D978,969 S 2/2023 Wang
D983,200 S 4/2023 Ali et al.
D983,269 S 4/2023 Daddar et al.
D992,644 S 7/2023 Ali et al.
2001/0012801 A1 8/2001 Komata
2003/0003993 A1 1/2003 Leifer
2004/0023719 A1 2/2004 Hussaini et al.
2004/0180720 A1 9/2004 Nashi et al.
2004/0224765 A1 11/2004 Martinez et al.
2004/0224768 A1 11/2004 Hussani et al.
2006/0279039 A1* 12/2006 Krieger .................. A63F 13/98 463/36
2007/0072680 A1 3/2007 Ikeda
2009/0088250 A1 4/2009 Carlson et al.
2009/0233671 A1 9/2009 Tsukahara
2010/0267454 A1 10/2010 Navid
2012/0244944 A1* 9/2012 Kotkin .................. A63F 13/24 463/37
2012/0302348 A1 11/2012 Karacal
2013/0077675 A1 3/2013 Rosen et al.
2014/0113723 A1 4/2014 Burgess
2015/0360126 A1* 12/2015 Burgess .................. A63F 13/20 463/37
2015/0363007 A1 12/2015 Lysenko
2016/0151706 A1 6/2016 Antonio
2016/0317918 A1 11/2016 Gassoway et al.
2016/0317919 A1* 11/2016 Gassoway ............... A63F 13/98
2016/0361639 A1 12/2016 Schmitz et al.
2017/0001109 A1 1/2017 Dornbusch et al.
2017/0354895 A1 12/2017 Dornbusch et al.
2018/0193732 A1* 7/2018 Kamata .................. A63F 13/24
2018/0264355 A1 9/2018 Burgess et al.
2019/0126140 A1 5/2019 Nelson et al.
2020/0038766 A1 2/2020 Dornbush et al.

FOREIGN PATENT DOCUMENTS

CA 162784 S 11/2016
CA 2969968 A1 12/2017
CA 3049007 A1 7/2018
CA 169939 S 11/2018
CA 2977382 A1 12/2018
CA 2932358 C 7/2020
CA 187859 S 11/2020
CA 3141811 A1 5/2022
CA 201150 S 10/2022
CA 201152 S 10/2022
CA 207342 S 6/2024
CA 3184103 A1 6/2024
GB 2481633 A 1/2012

OTHER PUBLICATIONS

Collective Minds, Collective Minds D-Grip Directional Pad & Silicone Cover—Black: Published Nov. 1, 2018 [online], site visited Sep. 11, 2019. Available from Internet URL: https://www.amazon.com/dp/B07J2JVFRD/ref=cm_sw_r_tw_dp_U_x_0UyEDbNFYWRGV (Year: 2018).

Collective Minds, Collective Minds D-Grip D-Pad Covers for the Nintendo Switch's Joy-Cons Left/Right: Published May 9, 2019 [online], site visited Sep. 11, 2019. Available from Internet URL: https://imgur.com/gallery/cYJvEnB (Year: 2019).

Collective Minds, Collective Minds Strike Pack Eliminator Adapter for Xbox One, online, no post date, URL: https://www.strikepackeliminator.com/, retrieved Apr. 13, 2020.

Xbox One (XB1) Collective Minds Strike Pack Setup, YouTube online, post date Dec. 14, 2018, URL: https://www.youtube.com/watch?v=wuSH3-K4EJQ, retrieved Apr. 13, 2020.

(56) References Cited

OTHER PUBLICATIONS

Amazon Joy-Con Gel Guards with Thumb Grips Caps for Nintendo Switch (Black) MIBOTE: Published Mar. 14, 2017 [online], site visited Sep. 11, 2019. Available from Internet URL: https://www.amazon.com/dp/B06XKT1M5K/ref=cm_sw_r_tw_dp_U_x_A6yEDb2G16V2C (Year: 2017).

Best Buy (n.d.). PowerA—Fusion Pro Wired Controller for Xbox One—White-B. https://www.bestbuy.com/site/powera-fusion-pro-controller-for-xbox-one-xbox-one-s-and-xbox-one-x-white-b/6356693.p?skuId=6356693.

Machkovech, S. (Jul. 15, 2015). Microsoft unveils new $150 Xbox One Elite controller—and we've held it. Arstechnica. https://arstechnica.com/gaming/2015/06/microsoft-unveils-new-xbox-one-elite-controller-and-weve-held-it/.

Kelly, S. (Dec. 7, 2015). Steam Under Fire—New Case: Ironburg Inventions v Valve (NDGA 2015). PatentArcade. http://www.patentarcade.com/2015/12/steam-under-fire-new-case-ironburg.html.

* cited by examiner 30b
36b
38b
36b
40b
32b
34
34
34

208
202
200
208
210
202

200
202
202
206
210
206
204
204

129
208
404
120
106
200
120
208
128
102
210
104
126
110
126
126
110

400
404
402
USB
micro-B
type plug

ACCESSORY USABLE WITH DIFFERENT VIDEO GAME CONTROLLERS

FIELD OF THE INVENTION

The present invention relates to an accessory for a video game controller, its attachment to controllers of different geometries, and its connection to different types of controller ports.

BACKGROUND OF THE INVENTION

Video game controllers conventionally have proprietary and/or unique designs and shapes, which differ across different manufacturers and even between different models from the same manufacturer. Accessories designed for one model and make may not fit other models and makes.

SUMMARY OF THE INVENTION

In one aspect, the present invention comprises an accessory for a video game controller that can be configured for releasable attachment to different video game controllers. The accessory has a body, and separate first and second body adapters, which allow the body to be alternately attached to either a first video game controller or a second video game controller, where the first and second controllers differ in geometry of a part which mates with the first and second body adapters. Each of first and second body adapters is geometrically configured for releasable attachment, by interference fit, to the body. Each of first and second body adapters also comprises a mating part that is geometrically configured for releasable attachment, by interference fit, to the mating part of the first controller and the second controller, respectively. By releasably attaching the body to either the first or second body adapter, the accessory can be non-permanently configured for attachment to the first or second controller, respectively.

BRIEF DESCRIPTION OF THE DRAWINGS

In the drawings, like elements may be assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention.

DETAILED DESCRIPTION OF THE INVENTION

The invention relates to an accessory for a video game controller. Any term or expression not expressly defined herein shall have its commonly accepted definition understood by a person skilled in the art.

Figures 1, 2:
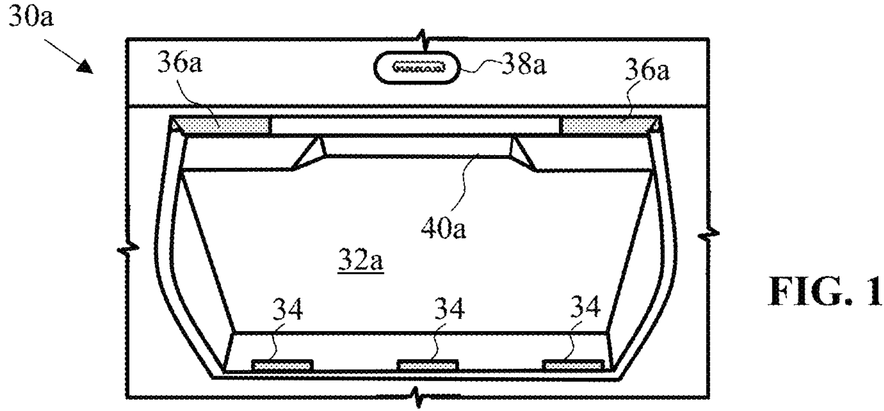
FIG. 1 shows a battery compartment and a controller port of an Xbox One™ controller.
FIG. 2 shows a battery compartment and a controller port of an Xbox Series X|S™ controller.

FIG. 1 shows a front-bottom portion of an Xbox One™ controller (30*a*) (model numbers 1537, 1697, and 1708). The controller (30*a*) has a battery compartment (32*a*), and defines rear slots (34) and front slots (36*a*) on the periphery of the battery compartment (32*a*), for insertion of tabs of a battery compartment cover. The controller (30*a*) also has a controller port (38*a*) for transmission of electronic signals generated by the controller (30*a*).

Xbox One™ controllers (model numbers 1537, 1697, and 1708) were followed by Xbox Series X™ and Series S™ controllers (commonly referred to as Xbox X|S™) (model number 1914). These variants of controllers are similar and functionally compatible with Xbox™ series consoles, but differ in some respects. As shown in FIG. 2, however, the Xbox X|S™ controllers have a different geometry of the battery compartment (32*b*) and its front slots (36*b*), and USB standard-C type receptacles for their controller ports (38*b*). On account of these differences, accessories which insert into the battery compartment designed specifically for Xbox One™ controllers cannot be used with Xbox X|S™ controllers.

Figure 3:
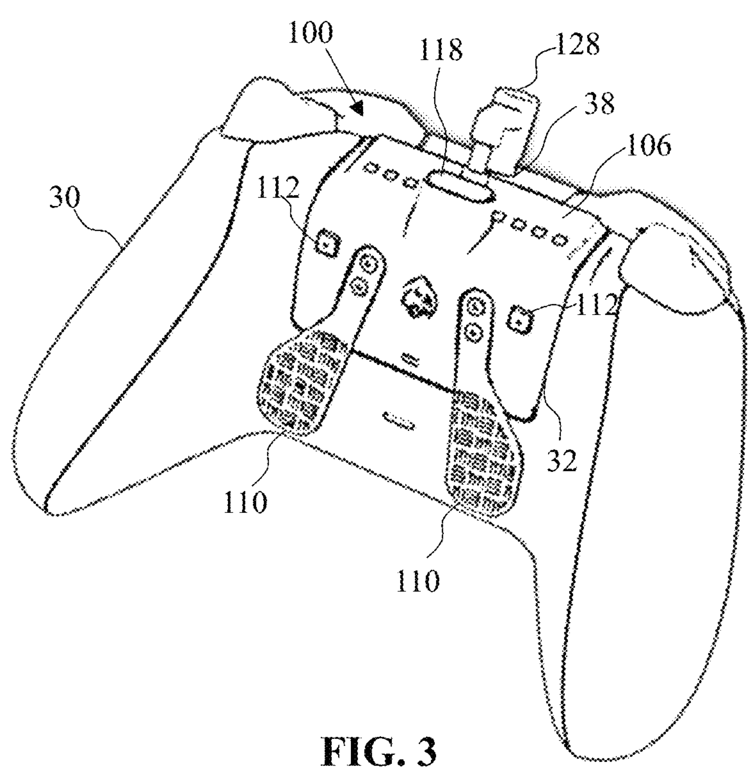
FIG. 3 shows a bottom perspective view of an embodiment of an accessory of the present invention, when attached to an Xbox™ series video game controller.

FIG. 3 shows an embodiment of an accessory (100) when attached to an Xbox™ series video game controller (30). The controller (30) can be any contoller, such as an Xbox One™ controller (model numbers 1537, 1697, and 1708) or an Xbox X|S™ controller (model number 1914), as the accessory (100) is configured to be used with such different variants despite differences in the geometries of their battery compartments (32*a*; 32*b*) or front slots (openings) (36*a*; 36*b*). It will be understood that the Xbox One™ and Xbox X|S™ variants of the controller (30) are non-limiting illustrative examples of a "first controller" and a "second controller", respectively, to which the present invention is applied, and that the present invention may be applied to controllers other than Xbox™ series controllers, such as Playstation™ controllers, for example.

Figure 4:
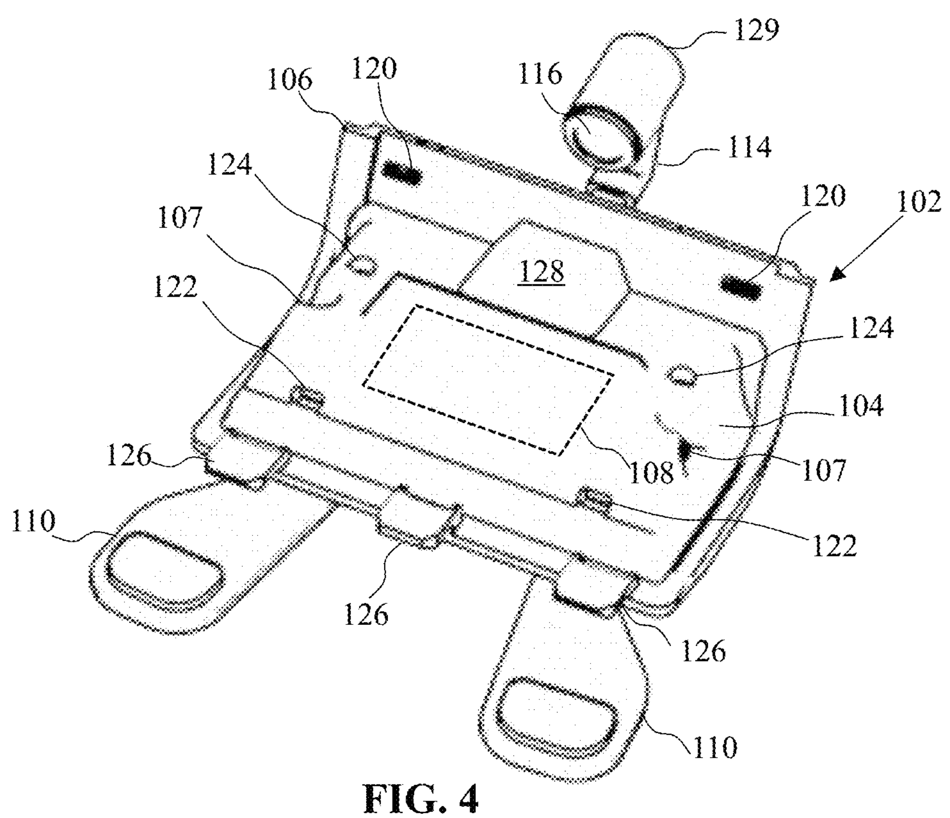
FIG. 4 shows a top-rear perspective view of part of an accessory of the present invention, before attachment of a body adapter, or an accessory port adapter.

FIG. 4 shows a top-rear perspective view of part of an embodiment of the accessory (100) of FIG. 3. In this embodiment, the accessory (100) includes a molded plastic body (102) formed by a housing portion (104) and a cover portion (106) attached to each other, for example by screws (107). The housing portion (104) contains a printed circuit board (PCB) (108) (hidden from view and shown in dashed line) with a microcontroller unit, and operatively connected electromechanical components that connect to external levers (110) that are used as game actuator mechanisms, and to programming buttons (112) (see FIG. 3). The PCB (108) is operatively connected via a cable or adapter (114) which has a first end (116) for receiving electronic signals generated by controller (30) and transmitted via its controller port (38), and a second end which connects to the accessory PCB (108) by any suitable connector, such as USB-C or USB Micro-B. The first end (116) may comprise any connector which mates with the controller port (38).

The PCB (108) is also operatively connected to a console port (118) (see FIG. 3) for attachment of a cable used to transmit controller electronic signals to the Xbox™ game console. The PCB (108) and its microcontroller unit may be configured to implement functionalities as described by Dornbusch et al. in U.S. Patent Application Publication nos. 2017/0001109 A1, and 2017/0354895 A1, the entire contents of which are incorporated by reference herein.

Figures 5, 6, 7, 8:
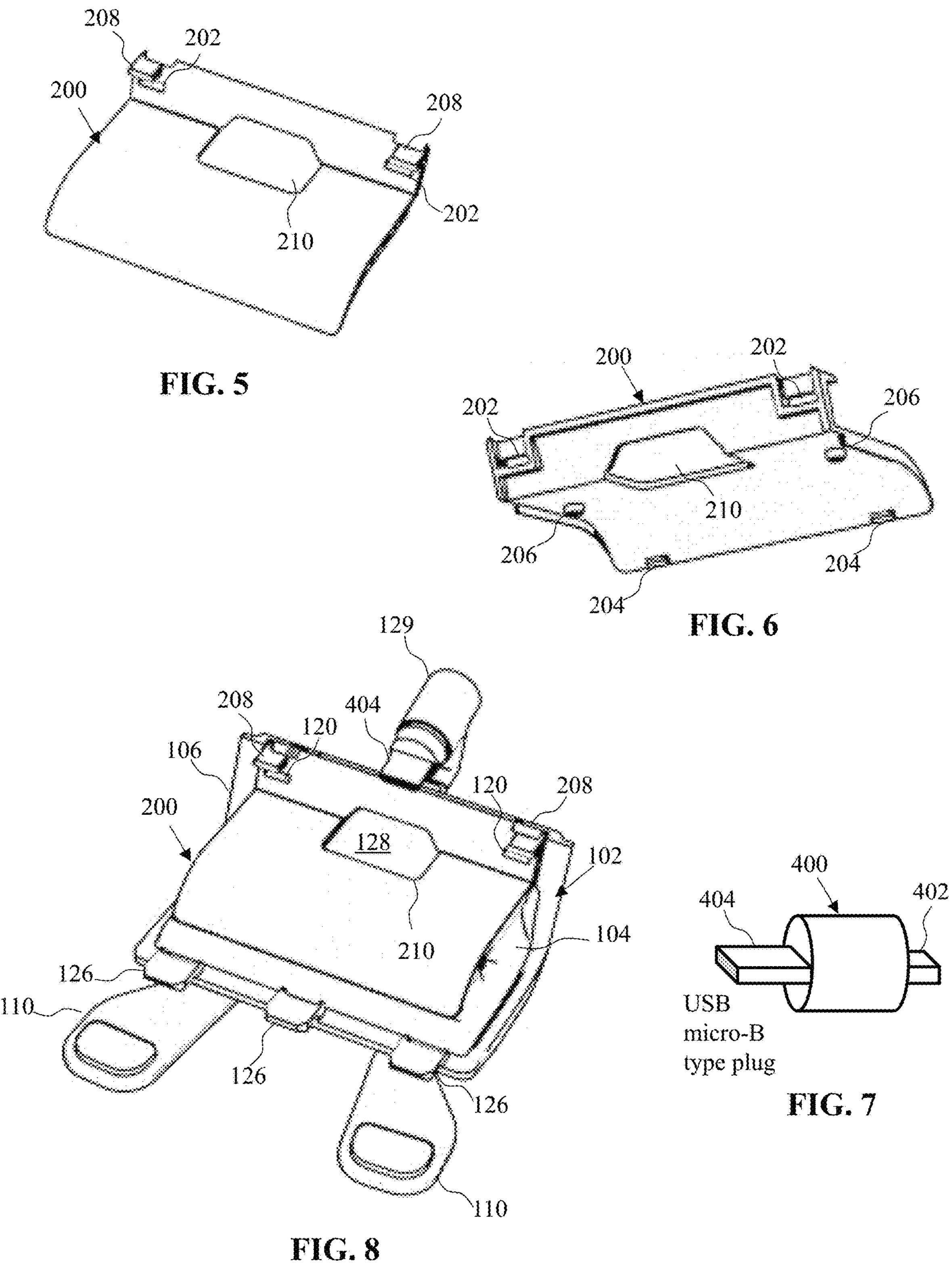
FIG. 5 shows a top-rear perspective view of a first body adapter for use with the embodiment of the accessory of FIG. 4.
FIG. 6 shows a bottom-front perspective view of the first body adapter of FIG. 5.
FIG. 7 shows a side perspective view of an embodiment of a first accessory port adapter.
FIG. 8 shows a top-rear perspective view of the accessory of FIG. 4, with the first body adapter of FIG. 5, and the first accessory port adapter of FIG. 7 attached thereto.
Figures 9, 10, 11, 12:
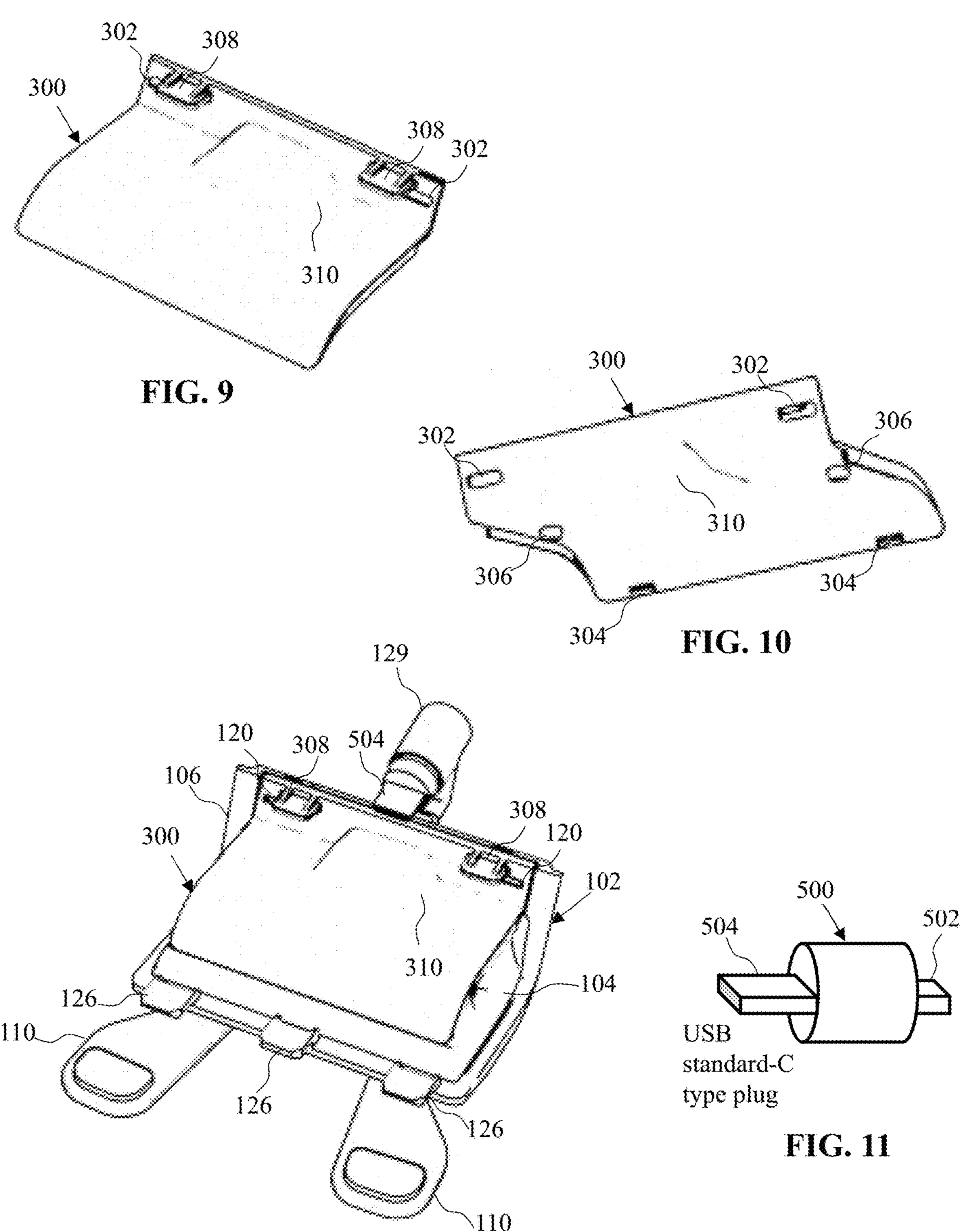
FIG. 9 shows a top-rear perspective view of a second body adapter for use with the embodiment of the accessory of FIG. 4.
FIG. 10 shows a bottom-front perspective view of the second body adapter of FIG. 9.
FIG. 11 shows a side perspective view of an embodiment of a second accessory port adapter.
FIG. 12 shows a top-rear perspective view of the accessory of FIG. 4, with the second body adapter of FIG. 9, and the second accessory port adapter of FIG. 11 attached thereto.

FIGS. 5 and 6 show a top-rear perspective view and a bottom-front perspective view, respectively, of an embodiment of a first body adapter that is used to attach the body (102) of the accessory (100) to a controller. FIGS. 9 and 10 show the same views of an embodiment of a second body adapter (300) that is used to attach the body (102) of the accessory (100) to another controller of a different type. In this embodiment, both the first and second body adapters (200; 300) are made of molded plastic.

Both the first and second body adapters (200; 300) are geometrically configured for releasable attachment, by interference fit, to the body (102) of the accessory (100). The term "interference fit", as used herein, refers to the secure connection of two mating parts by friction and/or bearing engagement between them, without the need for an additional fastener (e.g., screws) or adhesive. Non-limiting examples of interference fit between mating parts include tab-and-slot joints, post-and-hub joints, snap-fit joints, cantilevered lug-and-slot joints, and the like. In the embodiment shown in FIG. 4, the upper surface of the cover portion (106) defines a pair of front tabs (protrusions) (120), while the upper surface of the housing portion (104) defines a pair of rear slots (openings) (122), and a pair of hubs (receptacles) (124). In the embodiment shown in FIGS. 6 and 7, and 10 and 11, each of the first and second body adapters (200; 300) defines a pair of front slots (openings) (202; 302), a pair of rear tabs (protrusions) (204; 304), and a pair of posts (protrusions) (206; 306) on its bottom surface. Releasable attachment of the body (102) to the first body adapter (200) as shown in FIG. 8 or to the second body adapter (300) as shown in FIG. 12, is achieved by interference fit of the cover portion's front tabs (120) with the body adapter's front slots (202; or 302), the housing portion's rear slots (122) with the body adapter's rear tabs (204; or 304), and the housing portion's hubs (124) with the body adapter's posts (206; or 306). The interference fit between these mating parts securely attaches the body (102) to the first or second body adapter (200; 300), and limits inadvertent relative movement between them. Preferably, the interference fit allows the parts to be detached from each other using typical hand strength without the need for tools.

The first and second body adapters (200; 300) also have one or more mating part(s) that are geometrically different from each other, and geometrically configured for releasable attachment, by interference fit, to one or more mating part(s) of the first and second controllers, respectively. In the examples illustrated, the first and second controller mating parts are the portions of the Xbox One™ controller and Xbox X|S™ controller that define the pair of front slots (36*a*; 36*b*) on the periphery of the battery compartment (32*a*; 32*b*) as shown in FIG. 1 and FIG. 2, respectively. Referring to FIGS. 5 and 9, the mating parts of the first and second body adapters (200; 300) include front tabs (protrusions) (208; 308). The front tabs (208) of the first body adapter (200) are shaped for insertion into front slots (36*a*) of the controller (30*a*) shown in FIG. 1, whereas the front tabs (308) of the second body adapter (300) are spaced more closely together and shaped for insertion into front slots (36*b*) of the controller (30*b*) shown in FIG. 2.

Accordingly, the accessory (10) may be releasably attached to the Xbox One™ controller (30*a*) of FIG. 1, by attaching the body (102) to the first body adapter (200) as shown in FIG. 8, and then inserting the cover portion's rear tabs (126) into the controller's rear slots (34), and inserting the first body adapter's front tabs (208) into the controller's front slots (36*a*). Alternately, the accessory (10) may be releasably connected the Xbox X|S™ controller (30*b*) of FIG. 2, by attaching the body (102) to the second body adapter (300) as shown in FIG. 12, and then inserting the cover portion's rear tabs (126) into the controller' rear slots (34), and inserting the second body adapter's front tabs (308) into the controller's front slots (36*b*).

As shown in FIG. 3, when the accessory (100) is attached to a controller (30), the cover portion (106) of the body (102) of the accessory (100) closes the battery compartment (32) of the controller (30), with the first or second body adapter (200; 300) (as the case may be) inside the battery compartment (32). Referring to FIGS. 2 and 3, the shape of the battery compartment (32*a*; 32*b*) defined by the controllers (30*a*; 30*b*) differ from each other at least in respect to the shape of a contoured recess (40*a*; 40*b*) near the front edge of the battery compartment (32*a*; 32*b*). The contoured recess (40*b*) for the controller (30*b*) of FIG. 2, is vertically deeper and horizontally narrower than the contoured recess (40*a*) for the controller (30*a*) of FIG. 1. To accommodate this difference, each of the first and second body adapters (200; 300) have a portion (i.e., other than the mating parts of tabs (208; 308)) that are geometrically different from each other and configured for insertion into geometrically different battery compartments (32*a*; 32*b*) of the first and second controllers (30*a*; 30*b*), respectively. As shown in FIGS. 5 and 6, the first body adapter (320) defines an aperture (210) that allows the hump (128) to pass through, so that the upper surface of the second body adapter (200) can be abutted against the portions of the controller (30*a*) on either side of the recess (40*a*) of the controller (30*a*) of FIG. 1. In contrast, as shown in FIGS. 9 and 10, the second body adapter (300) defines a hump (310) that covers a hump (128) of the housing portion (104) (see FIG. 4), and has a shape that is complementary to the shape of the recess (40*b*) of the controller (30*b*) of FIG. 2.

In some embodiments, the accessory may comprise a connector to connect to a controller port (38), which comprises a cable or adapter (114). The cable or adapter is connected to the accessory, which optionally may be a permanent connection. The cable or adapter has an end (116) which allows for interchangeable adapters (400, 500) to be inserted. FIGS. 7 and 11 show a side perspective view of an embodiment of a first accessory port adapter (400) and a separate second accessory port adapter (500), respectively. Each accessory port adapter (400; 500) allows for communication of electronic signals from the controller port (38) to the accessory port (116). Each of the accessory port adapters (400; 500) has a first terminal (402; 502) that is configured for releasable connection to the accessory port (116). The first terminal (402; 502) may be so configured in a number of ways, depending on the configuration of the accessory port (116). As non-limiting examples, the accessory port (116) may define a female or male multi-pin electrical connector (e.g., of a USB type, or a mini-DIN type), while the first terminal may define a complementary male or female multi-pin electrical connector. In this embodiment, connection of the first terminal (402; 502) to the accessory port (116) may be aided by interference fit between a socket-like part (129) of the adapter (114) that includes the accessory port (116) and holds the body of the accessory port adapter (400; 500). The adapter (400, 500) and/or the socket (129) may be magnetized to allow for secure engagement while still permitting convenient disengagement and replacement of the adapter (400, 500).

The first accessory port adapter (400) has a second terminal (404) configured for releasable connection to the controller port (38*a*) of the controller (30*a*) shown in FIG. 1. In this embodiment, the controller port (38*a*) is a USB micro-B type receptacle, and accordingly, the second terminal (404) is a USB micro-B type plug. In contrast, the second accessory port adapter (500) has a second terminal (504) configured for releasable connection to the controller port (38*b*) of the controller (30*b*) shown in FIG. 2. In this embodiment, the controller port (38*b*) is a USB standard-C type receptacle, and accordingly, the second terminal (504) is a USB standard-C type plug. In other embodiments, the second terminals (404; 504) may be other types of plugs or receptacles to complement other types of receptacles or plugs of controller ports (38*a*; 38*b*).

The accessory port (116) may be releasably connected the controller port (38*a*) of the Xbox One™ controller (30*a*) shown in FIG. 1, by connecting the accessory port (116) to the first terminal (402) of the first accessory port adapter (400) as shown in FIG. 8, and then plugging the second terminal (404) of the first accessory port adapter (400) into the controller port (38*a*). Alternately, the accessory port (116) may be releasably connected the controller port (38*b*) of the Xbox X|S™ controller (30*b*) shown in FIG. 2, by connecting the accessory port (116) to the first terminal (502) of the second accessory port adapter (500) as shown in FIG. 12, and then plugging the second terminal (504) of the second accessory port adapter (500) into the controller port (38*b*).

Alternatively, the cable or adapter (114) may simply comprise a short cable or adapter with the desired terminal for connection to the controller port (38) at one end, and the accessory at the other end.

Interpretation.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The invention claimed is:

1. An accessory attachable alternately to either a first video game controller or a second video game controller, wherein the first video game controller comprises a first controller mating part and the second video game controller comprises a second controller mating part that is geometrically different from the first controller mating part, and each of the first and second video game controllers comprise a battery compartment, the accessory comprising:

a body;

a first body adapter and a separate second body adapter;

wherein each of the first and second body adapters is geometrically configured for releasable attachment, by interference fit, to the body;

wherein the first body adapter comprises a mating part that is geometrically configured for releasable attachment, by interference fit, to the first controller mating part, at the same time that the first body adapter is attached to the body;

wherein the second body adapter comprises a mating part that is geometrically different from the mating part of the first body adapter, and geometrically configured for releasable attachment, by interference fit, to the second controller mating part, at the same time that the second body adapter is attached to the body; and wherein each of the first and second body adapters comprise a portion that is geometrically configured for insertion into the battery compartment of the first video game controller and second video game controller, respectively, when the mating part of the first and second body adapter is respectively attached to the first and second controller mating part.

2. The accessory of claim 1, wherein the first and second controller mating parts each define a respective opening for receiving a protrusion of a battery compartment cover, and the mating part of the first and second body adapter each comprises a protrusion insertable into the opening.

3. The accessory of claim 1, wherein battery compartment of the first video game controller is geometrically different from the battery compartment of the second video controller and the portion of the first and second body adapter configured for insertion into the battery compartment of the first and second video game controller, respectively, are also correspondingly geometrically different.

4. A method for configuring an accessory comprising a body alternately for attachment to either a first video game controller or a second video game controller, wherein the first video game controller comprises a first controller mating part and the second video game controller comprises a second controller mating part that is geometrically different from the first controller mating part, and each of the first and second video game controllers comprise a battery compartment, the method comprising the steps of:

(a) a first body adapter and a separate second body adapter;

wherein each of the first and second body adapters is geometrically configured for releasable attachment, by interference fit, to the body;

wherein the first body adapter comprises a mating part that is geometrically configured for releasable attachment, by interference fit, to the first controller mating part, at the same time that the first body adapter is attached to the body; and wherein the second body adapter comprises a mating part that is geometrically different from the mating part of the first body adapter, and geometrically configured for releasable attachment, by interference fit, to the second controller mating part, at the same time that the second body adapter is attached to the body;

wherein each of the first and second body adapters comprise a portion that is geometrically configured for insertion into the battery compartment of the first video game controller and second video game controller, respectively, when the mating part of the first and second body adapter is respectively attached to the first and second controller mating part; and (b) releasably attaching, by interference fit, the body to either the first body adapter, or the second body adapter.

5. The method of claim 4, wherein the first and second controller mating parts each define a respective opening for receiving a protrusion of a battery compartment cover, and the mating part of the first and second body adapter each comprises a protrusion insertable into the opening.

6. The method of claim 4, wherein the battery compartment of the first video game controller is geometrically different from the battery compartment of the second video game controller, and the portion of the first and second body adapter configured for insertion into the battery compartment of the first and second game controller, respectively, are also correspondingly geometrically different.

* * * * *